United States Patent
Dube et al.

(10) Patent No.: US 11,773,723 B2
(45) Date of Patent: Oct. 3, 2023

(54) AIRFOIL RIB WITH THERMAL CONDUCTANCE ELEMENT

(71) Applicant: United Technologies Corporation, Farmington, CT (US)

(72) Inventors: Bryan P. Dube, Columbia, CT (US); Michael G. McCaffrey, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 322 days.

(21) Appl. No.: 16/685,457

(22) Filed: Nov. 15, 2019

(65) Prior Publication Data
US 2021/0148233 A1 May 20, 2021

(51) Int. Cl.
*F01D 5/14* (2006.01)

(52) U.S. Cl.
CPC ............ *F01D 5/14* (2013.01); *F05D 2220/32* (2013.01); *F05D 2260/22141* (2013.01); *F05D 2300/6033* (2013.01)

(58) Field of Classification Search
CPC ................... F01D 5/14; F05D 2220/32; F05D 2300/6033; F05D 2260/22141
See application file for complete search history.

(56) References Cited

U.S. PATENT DOCUMENTS

| 5,516,260 | A | 5/1996 | Damlis et al. |
| 6,514,046 | B1 | 2/2003 | Morrison et al. |
| 7,600,979 | B2 * | 10/2009 | Steibel .................. C04B 35/573 416/230 |
| 2007/0128043 | A1 | 6/2007 | Morrison et al. |
| 2008/0025846 | A1 * | 1/2008 | Vance ..................... F01D 5/147 416/233 |
| 2016/0177743 | A1 * | 6/2016 | Thomas .................... F01D 5/18 416/230 |
| 2017/0362943 | A1 * | 12/2017 | Pearson .................. F01D 5/282 |
| 2019/0153879 | A1 * | 5/2019 | Vetters .................... F01D 9/041 |

FOREIGN PATENT DOCUMENTS

| EP | 1085170 | 3/2001 |
| EP | 2599959 | 6/2013 |
| WO | 0012868 | 3/2000 |
| WO | 2017082868 | 5/2017 |

OTHER PUBLICATIONS

European Search Report for European Patent Application No. 20207145.2 completed Jan. 26, 2021.

* cited by examiner

*Primary Examiner* — Jacob M Amick
*Assistant Examiner* — Charles J Brauch
(74) *Attorney, Agent, or Firm* — Carlson, Gaskey & Olds, P.C.

(57) ABSTRACT

An airfoil includes an airfoil section that has a ceramic airfoil wall that defines a suction side and a pressure side. There is an interior cavity in the airfoil section. A rib spans across the interior cavity and connects the suction side and the pressure side. The rib has a thermal conductance element that is configured to conduct heat away from the suction side and the pressure side.

14 Claims, 3 Drawing Sheets

AIRFOIL RIB WITH THERMAL CONDUCTANCE ELEMENT

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramics, such as ceramic matrix composite ("CMC") materials, are also being considered for airfoils. CMCs have high temperature resistance. Despite this attribute, there are unique challenges to implementing CMCs in airfoils.

SUMMARY

An airfoil according to an example of the present disclosure includes an airfoil section that has a ceramic airfoil wall that defines a suction side and a pressure side, and an interior cavity in the airfoil section. A rib spans across the interior cavity and connects the suction side and the pressure side. The rib has a thermal conductance element that is configured to conduct heat away from the suction side and the pressure side.

In a further embodiment of any of the foregoing embodiments, the thermal conductance element is a monolithic ceramic.

In a further embodiment of any of the foregoing embodiments, the monolithic ceramic is selected from SiC, Si3N4, and combinations thereof.

In a further embodiment of any of the foregoing embodiments, the ceramic airfoil wall is a ceramic matrix composite.

In a further embodiment of any of the foregoing embodiments, the thermal conductance element has a central wall that spans between first and second side edges. The first side edge has a first flange at which the thermal conductance element meets the suction side of the ceramic airfoil wall, and the second side edge has a second flange at which the thermal conductance element meets the pressure side.

In a further embodiment of any of the foregoing embodiments, the rib includes a forward side ceramic matrix composite skin, an aft side ceramic matrix composite skin, and the thermal conductance element is between the forward side ceramic matrix composite skin and the aft side ceramic matrix composite skin.

In a further embodiment of any of the foregoing embodiments, the airfoil section extends over a radial span, and the thermal conductance element substantially fully extends the radial span.

In a further embodiment of any of the foregoing embodiments, the thermal conductance element has a first thermal conductivity. The ceramic airfoil wall has a second thermal conductivity, and the first thermal conductivity is greater than the second thermal conductivity by a factor of at least 1.5.

In a further embodiment of any of the foregoing embodiments, the factor is up to 3.5.

An airfoil according to an example of the present disclosure includes an airfoil section that has a ceramic matrix composite airfoil wall that defines a suction side and a pressure side, and an interior cavity in the airfoil section. A rib spans across the interior cavity and connects the suction side and the pressure side. The rib has a forward side ceramic matrix composite skin, an aft side ceramic matrix composite skin, and a monolithic ceramic core between the forward side ceramic matrix composite skin and the aft side ceramic matrix composite skin.

In a further embodiment of any of the foregoing embodiments, the forward side ceramic matrix composite skin and the aft side ceramic matrix composite skin both are formed of SiC fibers disposed in a SiC matrix.

In a further embodiment of any of the foregoing embodiments, the monolithic ceramic core is selected from SiC, Si3N4, and combinations thereof.

In a further embodiment of any of the foregoing embodiments, the forward side ceramic matrix composite skin and the aft side ceramic matrix composite skin each extend beyond the rib and circumscribe respective first and second sub-cavities.

In a further embodiment of any of the foregoing embodiments, the monolithic ceramic core has a first thermal conductivity. The ceramic matrix composite airfoil wall has a second thermal conductivity, and the first thermal conductivity is greater than the second thermal conductivity by a factor of 1.5 to 3.5.

In a further embodiment of any of the foregoing embodiments, the monolithic ceramic core has a central wall that spans between first and second side edges. The first side edge has a first flange at which the monolithic ceramic core meets the suction side of the ceramic matrix composite airfoil wall, and the second side edge has a second flange at which the monolithic ceramic core meets the pressure side of the ceramic matrix composite airfoil wall.

In a further embodiment of any of the foregoing embodiments, the airfoil section extends over a radial span, and the monolithic ceramic core substantially fully extends the radial span.

A gas turbine engine according to an example of the present disclosure includes a compressor section, a combustor in fluid communication with the compressor section, and a turbine section in fluid communication with the combustor. The turbine section includes an airfoil that has an airfoil section having a ceramic airfoil wall defining a suction side and a pressure side, an interior cavity in the airfoil section, and a rib that spans across the interior cavity and connects the suction side and the pressure side. The rib has a thermal conductance element that is configured to conduct heat away from the suction side and the pressure side.

In a further embodiment of any of the foregoing embodiments, the thermal conductance element is a monolithic ceramic selected from SiC, Si3N4, and combinations thereof, the ceramic airfoil wall is a ceramic matrix composite.

In a further embodiment of any of the foregoing embodiments, the rib includes a forward side ceramic matrix composite skin, an aft side ceramic matrix composite skin, and the thermal conductance element is between the forward side ceramic matrix composite skin and the aft side ceramic matrix composite skin. The thermal conductance element has a central wall that spans between first and second side edges. The first side edge has a first flange at which the thermal conductance element meets the suction side of the ceramic airfoil wall, and the second side edge has a second flange at which the thermal conductance element meets the pressure side.

In a further embodiment of any of the foregoing embodiments, the airfoil section extends over a radial span. The thermal conductance element substantially fully extends the radial span. The thermal conductance element has a first thermal conductivity. The ceramic airfoil wall has a second thermal conductivity, and the first thermal conductivity is greater than the second thermal conductivity by a factor of 1.5 to 3.5.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
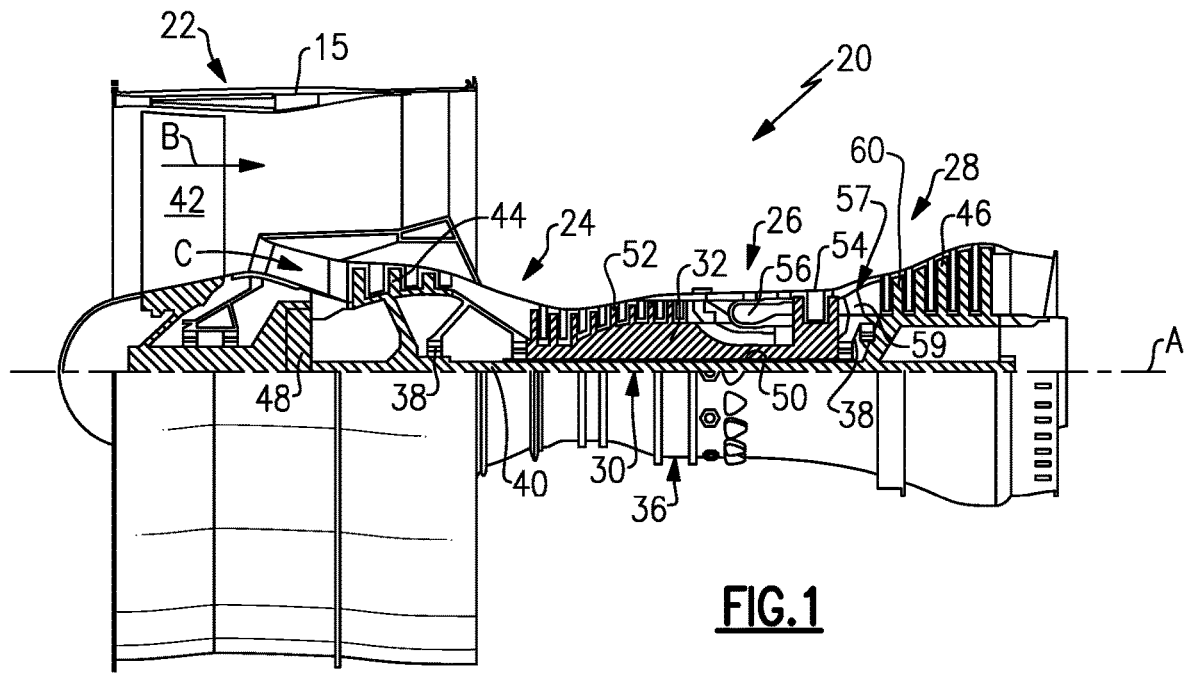
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2:
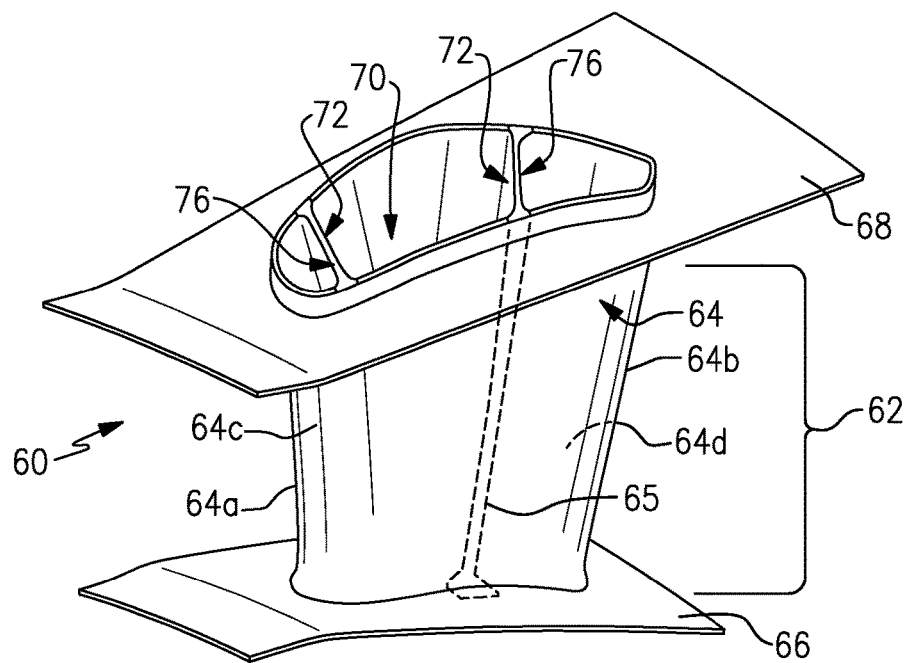
FIG. 2 illustrates an airfoil of the gas turbine engine.
Figure 3:
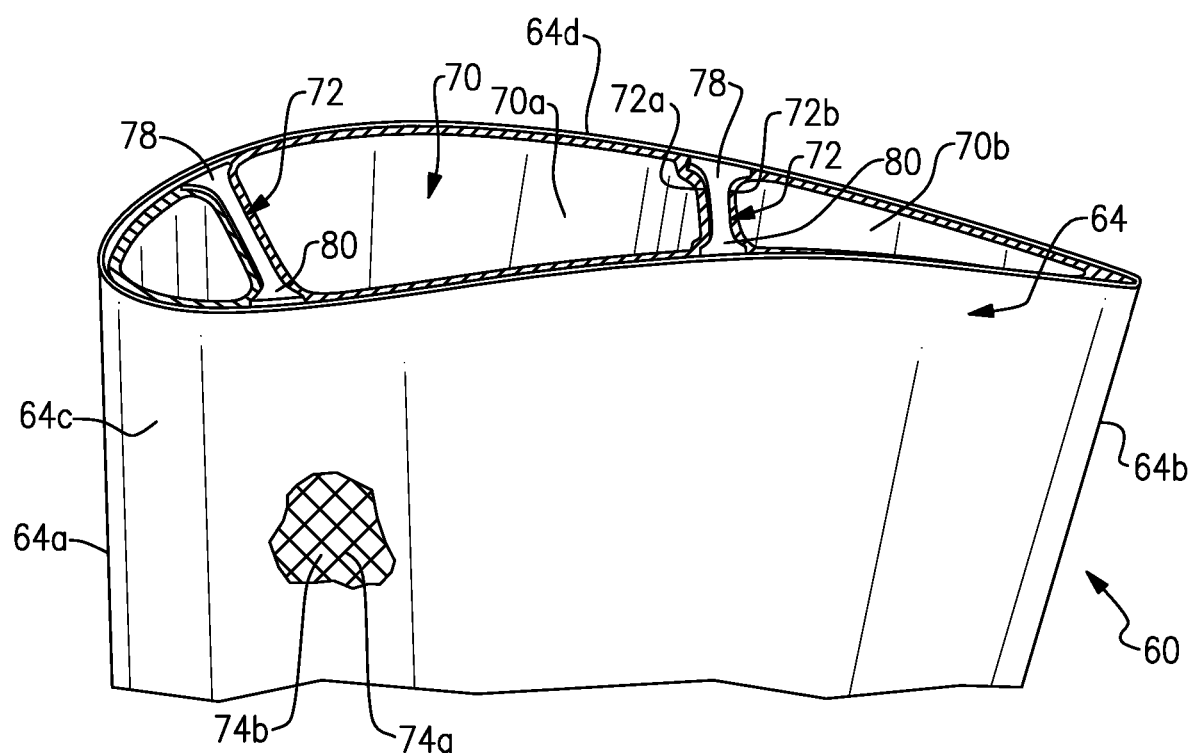
FIG. 3 illustrates a sectioned view of the airfoil.

FIG. 2 illustrates a representative airfoil 60 used in the turbine engine 20 (see also FIG. 1), and FIG. 3 illustrates a sectioned view of the airfoil 60. As shown, the airfoil 60 is an airfoil turbine vane; however, it is to be understood that, although the examples herein may be described and shown with reference to turbine vanes, this disclosure is also applicable to cooled blades that have an internal rib, or a blade outer Airseal with a rib or flange region.

In this example, the airfoil 60 includes an airfoil section 62 that is formed by a ceramic airfoil wall 64 (hereafter "wall 64") that delimits an aerodynamic profile. In this regard, the wall 64 defines a leading end 64a, a trailing end 64b, and first and second sides 64c/64d that join the leading end 64a and the trailing end 64b. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa. In this example, the first side 64c is a pressure side and the second side 64d is a suction side. The wall 64 generally extends in a radial direction relative to the central engine axis A. For a vane, the wall 64 spans from a first or inner platform 66 to a second or outer platform 68. The terms "inner" and "outer" refer to location with respect to the central engine axis A, i.e., radially inner or radially outer. For a blade, the airfoil wall 64 would extend from a single inner platform to a free end.

The wall 64 circumscribes an interior cavity 70 for receiving cooling air, such as bleed air from the compressor section 24. The cooling air may be provided through a port or ports in one or both of the platforms 66/68.

The airfoil 60 further includes at least one rib 72 that connects the opposed first and second sides 64c/64d of the airfoil wall 64, i.e., the gas path (or hot) walls. In the illustrated example, there are two ribs 72 that divide the interior cavity 70 into sub-cavities. Although one rib 72 may be described herein, it is to be understood that the other rib or ribs 72 have the same features. In the illustrated example, the rib 72 is generally radially elongated between the platforms 66/68 such that it spans the full or substantially full radial distance of the airfoil wall 64, as indicated at 65. The term substantially full refers to at least 90% of the radial span between the platforms 66/68. The rib 72 may facilitate structurally tying the sides 64c/64d together to thereby reinforce the sides 64c/64d against loading from internal static pressure in the cavity 70.

The wall 64 is ceramic. For example, the ceramic is a monolithic ceramic, a ceramic matrix composite ("CMC"), or a combination thereof. CMCs are comprised of a ceramic reinforcement, which is usually ceramic fibers, in a ceramic matrix. A monolithic ceramic does not contain reinforcement and may be a solid poly- or mono-crystalline ceramic. Example monolithic ceramics are, but are not limited to, silicon-containing monolithic ceramics. Example silicon-containing monolithic ceramics are, but are not limited to, silicon carbide (SiC) monolithic ceramic or silicon nitride ($Si_3N_4$) monolithic ceramic. Example ceramic matrices of the CMC are silicon-containing ceramic, such as but not limited to, a silicon carbide (SiC) matrix or silicon nitride ($Si_3N_4$) matrix. Example ceramic reinforcement of the CMC are silicon-containing ceramic fibers, such as but not limited to, silicon carbide (SiC) fiber or silicon nitride ($Si_3N_4$) fibers.

As shown in a cutaway view in FIG. 3, one example CMC is a SiC/SiC CMC in which SiC fibers 74a are disposed within a SiC matrix 74b. The CMC may be comprised of fiber plies that are arranged in a stacked configuration and formed to the desired geometry of the airfoil 60. For instance, the fiber plies may be layers or tapes that are laid-up one on top of the other to form the stacked configuration. The fiber plies may be woven or unidirectional, for example. At least a portion of the fiber plies may be continuous through the first platform 66, the airfoil section 62, and the second platform 68.

In a metallic article, heat may be readily conducted from external surfaces of the adjacent hot walls to internal ribs. Even though the ribs will be actively cooled on both surfaces by cooling air, the higher strength and ductility of traditional superalloys allows for this large temperature gradient from the rib to the internal surface of the hot wall to not affect durability of the component. Components formed from ceramics, however, have significantly lower thermal conductivity than superalloys and do not possess the same strength and ductility, making them more susceptible to distress from thermal gradients and the thermally induced stresses those form. For instance, although a CMC wall is exposed to the high temperatures in the core gas path, a CMC rib may be at a substantially lower temperature (e.g., at least >200° F. lower) due to the low thermal conductivity of the CMC. This, in turn, may generate high thermal gradients between the wall and the rib resulting in relatively large thermally induced stresses in the rib. Therefore, while it may be permissible to cool metallic ribs or structures, cooling of a CMC rib may exacerbate thermal gradients above the CMC capability and thus be counter-productive to meeting durability goals. In this regard, as will discussed in additional detail below, the rib 72 includes a thermal conductance element 76 that serves to facilitate heat conduction away from the sides 64c/64d and into the rib 72 to maintain the rib 72 at a relatively higher temperature.

Figure 4:
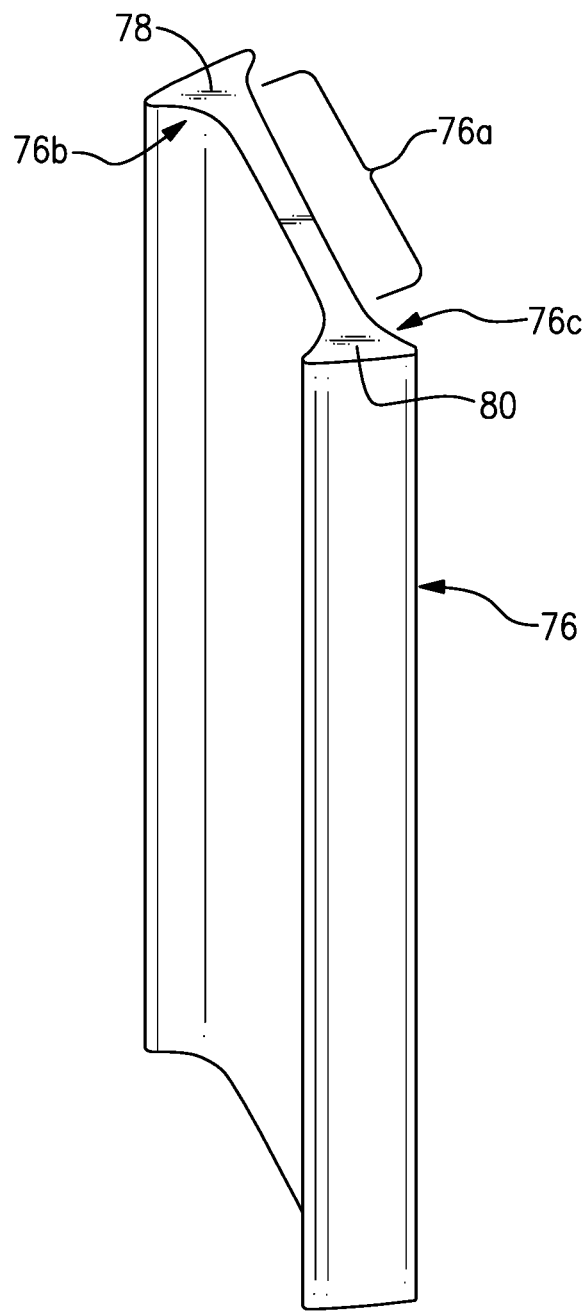
FIG. 4 illustrates an isolated view of a thermal conductance element.

Referring also to FIG. 4 that shows an isolated view of a representative thermal conductance element 76, the thermal conductance element 76 is radially elongated and includes a central wall 76a that spans between first and second side edges 76b/76c. The first side edge 76b has a first flange 78 and the second side edge 76c has a second flange 80. As shown in FIGS. 2 and 3, the first flange 78 meets the suction side 64d, and the second flange 80 meets the pressure side 64c. As used herein, the term "meet" refers to an interface between two structures, such as contact between the structures, where heat can flow from one structure to the other. For example, the flanges 78/80 abut, and are bonded with, one or more plies that form the sides 64c/64d in order to facilitate thermal conduction from the sides 64c/64d to the thermal conductance element 76.

The flanges 78/80 are enlarged in thickness relative to the central wall 76a. In the illustrated example, the flanges 78/80 are enlarged in thickness both fore and aft of the central wall 76a. The enlarged size of the flanges 78/80 facilitates augmenting the cross-sectional area for heat conduction from the sides 64c/64d into the thermal conductance element 76.

To facilitate heat flow from the sides 64c/64d into the thermal conductance element 76, the thermal conductance element 76 has a first thermal conductivity, the wall 64 has a second thermal conductivity, and the first thermal conductivity is greater than the second thermal conductivity by a factor of at least 1.5. Unless indicated otherwise, thermal conductivities are presumed herein to be the SI units of watts per meter-kelvin. It is also to be appreciated that factors of lower than 1.5 could be used, however, a de minimus difference in thermal conductivity is expected to have minimal effect for heating the rib 72. Therefore, a factor of at least about 1.5 should be used. In a further example, the first thermal conductivity is greater than the second thermal conductivity by a factor of 1.5 to 3.5. It is also to be appreciated that factors that are greater than 3.5 could be used, however, high factors may provide diminishing thermal benefits.

The thermal conductivities discussed herein can be determined using known standardized testing procedures, provided that the same procedure is used for each material. Example procedures include ASTM E1225, comparative rod test, and ASTM 1461, laser flash thermal diffusivity, and would be used for conductivity measurements in the range of 1500° F.-2400° F., but could be used to 2700° F. and beyond. The conductivities of interest would be a function of the fiber architecture, matrix and fiber, with the in-plane conductivity defined as generally aligned with the fibers or woven layer of fibers. The through-thickness conductivity generally aligned in the direction through multiple layers of fibers or woven layers of fiber. Generally, the through-thickness conductivity is substantially less than the in-plane conductivity because SiC fibers have a high conductivity and transmit heat along the fiber length, whereas the interface coating, typically boron nitride has a low thermal conductivity, and a large fraction of the thickness of a CMC laminate, resulting in a reduced through-thickness conductivity. Additionally, porosity in the matrix, which can exist the in-plane direction and through-thickness direction, acts as an insulator with no conductivity, and further reduces the overall in-plane and through-thickness conductivity. The addition of metallic silicon into the matrix, known in the art as the "Melt-Infiltration" process, can also greatly reduce porosity and consequently increase conductivity. The melting point of the silicon, however, limits CMCs with metallic silicon to temperatures generally less than about 2400° F.

In one example, the wall 64 is formed of a CMC, such as the SiC/SiC discussed above, and the thermal conductance element 76 is a monolithic ceramic. As example, the monolithic ceramic is selected from SiC, $Si_3N_4$, or combinations thereof. In a further example, the monolithic ceramic is SiC and is predominantly of the alpha polymorph of SiC. The term "predominantly" refers to the alpha polymorph being the most abundant polymorph in terms of volume fraction, which can be determined or estimated using known microscopy techniques.

In particular, CMC such as SiC/SiC can have relatively low thermal conductivity. The thermal conductivity of the CMC may be further lowered depending on the fabrication process. For instance, chemical vapor deposition of the matrix tends to produce a relatively higher porosity in comparison to melt infiltration techniques of forming the matrix. Such porosity can act as a thermal insulator and thus lower the bulk thermal conductivity of the matrix below that of the intrinsic thermal conductivity of the matrix material. Monolithic ceramics, such as the silicon carbide and silicon nitride above, generally have higher thermal conductivity than the CMCs discussed above and are thus used in examples herein for the thermal conductance element 76 to conduct heat from the sides 64c/64d. The heat conducted into the rib 72 maintains the rib 72 at a relatively higher temperature, thereby facilitating reduction in thermal gradients between the rib 72 and the hot sides 64c/64d.

In the illustrated examples, the rib 72 has a "sandwich" configuration. For instance, the thermal conductance element 76 serves as a core. The rib 72 includes a forward side ceramic matrix composite skin 72a and an aft side ceramic matrix composite skin 72b. The thermal conductance element 76, or core, is between the skins 72a/72b. In this regard, in examples in which the thermal conductance element 76 is monolithic ceramic, the thermal conductance element 76 can also be considered to be a monolithic ceramic core.

As also shown in FIG. 3, the skins 72a/72b extend beyond the rib 72 and circumscribe respective first and second sub-cavities 70a/70b. For instance, the skins 72a/72b are tubes, with the thermal conductance element 76 sandwiched between and then an outer ply or plies of the CMC wrapped around the periphery. The tube configuration of the skins 72a/72b provides strength and stiffness to reinforce the airfoil 60. In such a configuration, the flanges 78/80 of the thermal conductance element 76 also serve to take up the "noodle" region at the corners of the rib 72 between the tubes and the outer plies.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section having a ceramic matrix composite airfoil wall having first and second ceramic matrix composite skins in the form of respective forward and aft tubes, and an outer skin wrapped around a periphery of the forward and aft tubes, the outer skin defining a suction side and a pressure side, and the forward and aft tubes circumscribing respective first and second cavities; and
a rib spanning across the airfoil section and connecting the suction side and the pressure side, the rib including a monolithic ceramic core defining first and second side edges and a central wall there between, the first side edge meeting the suction side and the second side edge meeting the pressure side, the rib having a sandwich configuration in which the monolithic ceramic core is located between the forward and aft tubes such that the forward tube spans from the first side edge to the second side edge and across a forward side of the central wall of the monolithic ceramic core and the aft tube spans from the first side edge to the second side edge and across an aft side of the central wall of the monolithic ceramic core.

2. The airfoil as recited in claim 1, wherein the forward and aft tubes both are formed of SiC fibers disposed in a SiC matrix.

3. The airfoil as recited in claim 2, where the monolithic ceramic core is selected from SiC, $Si_3N_4$, and combinations thereof.

4. The airfoil as recited in claim 1, wherein the monolithic ceramic core has a first thermal conductivity, the ceramic matrix composite airfoil wall has a second thermal conductivity, and the first thermal conductivity is greater than the second thermal conductivity by a factor of 1.5 to 3.5.

5. The airfoil as recited in claim 1, wherein the first side edge has a first flange at which the monolithic ceramic core meets the suction side of the ceramic matrix composite airfoil wall, and the second side edge has a second flange at which the monolithic ceramic core meets the pressure side of the ceramic matrix composite airfoil wall.

6. The airfoil as recited in claim 5, wherein the airfoil section extends over a radial span, and the monolithic ceramic core substantially fully extends the radial span.

7. The airfoil as recited in claim 1, wherein the monolithic ceramic core is SiC and is, by volume, predominantly of an alpha polymorph of SiC.

8. The airfoil as recited in claim 1, wherein the forward tube defines a full circumferential border of the first cavity, and the aft tube defines a full circumferential border of the second cavity.

9. A gas turbine engine comprising:
a compressor section;
a combustor in fluid communication with the compressor section; and
a turbine section in fluid communication with the combustor, the turbine section including,
an airfoil including an airfoil section having a ceramic matrix composite airfoil wall including first and second ceramic matrix composite skins in the form of respective forward and aft tubes, and an outer skin wrapped around a periphery of the forward and aft tubes, the outer skin defining a suction side and a pressure side, and the forward and aft tubes circumscribing respective first and second cavities, and
a rib spanning across the airfoil section and connecting the suction side and the pressure side, the rib including a monolithic ceramic core defining first and second side edges and a central wall there between, the first side edge meeting the suction side and the second side edge meeting the pressure side, the rib having a sandwich configuration in which the monolithic ceramic core is located between the forward and aft tubes such that the forward tube spans from the first side edge to the second side edge and across a forward side of the central wall of the monolithic ceramic core and the aft tube spans from the first side edge to the second side edge and across an aft side of the central wall of the monolithic ceramic core.

10. The gas turbine engine as recited in claim 9, wherein the forward and aft tubes both are formed of SiC fibers disposed in a SiC matrix.

11. The gas turbine engine as recited in claim 10, where the monolithic ceramic core is selected from SiC, $Si_3N_4$, and combinations thereof.

12. The gas turbine engine as recited in claim 11, wherein the first side edge has a first flange at which the monolithic ceramic core meets the suction side of the ceramic matrix composite airfoil wall, and the second side edge has a second flange at which the monolithic ceramic core meets the pressure side of the ceramic matrix composite airfoil wall.

13. The gas turbine engine as recited in claim 12, wherein the monolithic ceramic core has a first thermal conductivity, the ceramic matrix composite airfoil wall has a second thermal conductivity, and the first thermal conductivity is greater than the second thermal conductivity by a factor of 1.5 to 3.5.

14. The gas turbine engine as recited in claim 13, wherein the airfoil section extends over a radial span, and the monolithic ceramic core substantially fully extends the radial span.

* * * * *